US007571128B1

(12) United States Patent
Brown (10) Patent No.: US 7,571,128 B1
(45) Date of Patent: Aug. 4, 2009

(54) MULTI-VEHICLE INCENTIVE PROGRAM

(75) Inventor: Gregory Brown, Dearborn, MI (US)

(73) Assignee: Ford Motor Company, Dearborn, MI (US)

(*) Notice: Subject to any disclaimer, the term of this patent is extended or adjusted under 35 U.S.C. 154(b) by 550 days.

(21) Appl. No.: 11/275,744

(22) Filed: Jan. 26, 2006

(51) Int. Cl.
*G06Q 40/00* (2006.01)
(52) U.S. Cl. .............................. 705/35; 705/38; 705/39; 705/40
(58) Field of Classification Search .................. 705/35, 705/38–45
See application file for complete search history.

(56) References Cited

U.S. PATENT DOCUMENTS

| 2005/0004860 | A1* | 1/2005 | Pretell et al. | 705/38 |
|---|---|---|---|---|
| 2006/0015422 | A1* | 1/2006 | Dion | 705/35 |
| 2006/0069640 | A1* | 3/2006 | Fitzgerald et al. | 705/38 |
| 2006/0095289 | A1* | 5/2006 | Bunning | 705/1 |
| 2007/0083327 | A1* | 4/2007 | Brice et al. | 701/210 |

OTHER PUBLICATIONS

Victoria Transport Policy Institute. Transportation Cost and Benefit Analysis. May 23, 2003.pp. 5.1-1 to 5.1-13.*
Compass Bank Website. Mortgatge Refinancing and Consolidating Your Loans. Oct. 20, 2002. http://web.archive.org/web/20021020162355/http://partners.financenter.com/compass/learn/guides/refinance/reficonsolidate.fcs.*
The Mortgage Professor's Calculator on Refinancing Two Mortgages to Lower Costs.Sep. 29, 2000. http://web.archive.org/web/20000929090753/http://eee.decisionaide.com/mpcalculators/RefinancingTwo Mortgages/Refi2.asp.*
MTG Professor Question. Combine Two Properties in One Mortgage. Jun. 18, 2001. http://www.mtgprofessor.com/A%2-=%20Qualifying/combine_two_properties_in_one_mortgage.htm.*
The True Cost of Driving. Commute Solutions. Dec. 12, 2003. http://web.archive.org/web/20031212111305/http://www.commutesolutions.org/calc.htm.*
Google Answers Question on Purchasing A Second More Fuel-Efficient Car. Nov. 21, 2002. http://answers.google.com/answers/threadview/id/112079.html.*
AAA Your Driving Costs Brochure. Oct. 25, 2005. https://web.archive.org/web/20051026192331/www.aaapublicaffairs.com/Files/OntheRoad/Driving_Costs.05.pdf.*
Lazarony, Lucy. Driving A More Fuel-Efficient Car. BankRate.com. Apr. 20, 2005. http://www.bankrate.com/brm/news/auto/fuel-efficient/1.asp.*
Canadian Automobile Association Driving Costs 2005 Edition. www.peoplescar.org/pages/documents/CAA_annual_driving_costs_2005.pdf.*

* cited by examiner

*Primary Examiner*—Susanna M Diaz
*Assistant Examiner*—Stephanie Ziegle
(74) *Attorney, Agent, or Firm*—Gregory Brown; Brooks Kushman P.C.

(57) ABSTRACT

A method and computer system for structuring two-vehicle financing. A price for a first vehicle having a first fuel economy is determined, and an average amount that the first vehicle will be driven each month is estimated. These steps are repeated for a second vehicle having a second fuel economy. Loan/lease terms are determined for both vehicles combined. A monthly transportation cost for the first and second vehicles combined is calculated based on the monthly loan or lease payment and the estimated amount that the first and second vehicles will be driven each month, respectively.

20 Claims, 4 Drawing Sheets

Fig. 1

| CURRENT VEHICLE BUDGET |||
|---|---|---|
| BUDGET CATEGORY | MONTHLY EXPENSE | % OF TOTAL |
| VEHICLE PAYMENT (2003; $37,367; $0 DOWN; 60 MOS; 4.9%) | $703 | 58% |
| FUEL ($2.40/GAL; 20K MI/YR; 13 MPG) | $307 | 26% |
| MAINTENANCE | $104 | 8.5% |
| INSURANCE | $90 | 7.5% |
| REGISTRATION | $10 | 1% |
| TOTAL: | $1214 | 100% |

*Fig. 2*

| TWO VEHICLE BUDGET ||||
|---|---|---|---|
| BUDGET CATEGORY ||  MONTHLY EXPENSE | % OF TOTAL |
| MONTHLY PAYMENT | VEHICLE 1 (2003; $16,363; 36 MOS; 4.9%) | $666 | 61% |
| | VEHICLE 2 PAYMENT (2006; $19,000; $0 DOWN; 60 MOS; 4.9%) | | |
| FUEL | VEHICLE 1 ($2.40/GAL; 5K MI/YR; 13 MPG) | $197 | 18% |
| | VEHICLE 2 ($2.40/GAL; 15K MI/YR; 25 MPG) | | |
| MAINTENANCE || $60 | 5% |
| INSURANCE || $150 | 14% |
| REGISTRATION || $20 | 2% |
| TOTAL: || $1092 | 100% |
| POSITIVE BUDGET IMPACT: || $122 | |

MULTI-VEHICLE INCENTIVE PROGRAM

BACKGROUND OF THE INVENTION

1. Field of the Invention

The present invention relates to a two-vehicle financing program that considers the respective fuel economy of two vehicles, and the amount the two vehicles are driven, in determining a transportation cost and a financing program for the two vehicles combined.

2. Background Art

Automobile manufacturers and retailers are continuously seeking innovative ways to make vehicle pricing and financing more attractive to their customers. In conventional programs, vehicle manufacturers offer incentives directly to their customers to induce vehicle sales and leasing. The incentives may include cash rebates and low interest financing. Cash rebates are typically provided to the customer at the point of sale to reduce the net price of the vehicle. Low interest financing may be offered as an alternate or combined incentive. In other programs, vehicle manufacturers provide incentives to the automobile dealers. Dealer incentives may or may not be passed on to the customer.

With rising fuel costs, customers that currently own lower fuel economy vehicles, such as trucks and SUVs, are faced with an unexpected dilemma. The total cost to own their vehicle is higher today than the customers expected at the time of purchase when fuel costs were lower. For budgetary reasons, these customers may decide to sell or trade-in their current vehicle to obtain a more fuel efficient model, sacrificing the other advantages and comforts that their current vehicles offer.

The premature sale of vehicles can have a variety of negative impacts. First, the customers sell their vehicles early because of increased fuel costs—not because the customers are dissatisfied with the vehicles themselves. This may result in an undeserved reputation for the vehicle manufacturers that their vehicles are less desirable. Accordingly, new sales of the larger vehicles such as trucks and SUVs could decline, resulting in decreased revenue and overstocking. New vehicle overstocking, coupled with premature customer sell-offs, can saturate the market with larger vehicles, resulting in decreased residual values overall. Decreased residual values impacts both current vehicle owners, creditors and lessors. Vehicle owners (or dealerships in the case of trade-ins) will not be able to resell the vehicles for their actual value, resulting in a loss of equity and/or an increase in the number of debtors that default on their loans. In the case of leased vehicles, the lessors carry the same risk of decreased residual values, but on a magnified scale due to the number of vehicles leased and the residual risk associated with each individual vehicle. In short, it is in the best interest of vehicle owners, vehicle manufacturers, financiers and lessors to avoid the premature sell-off of vehicles due to increased fuel costs.

In many instances, customers have a dual use for the vehicles they own: commuting to and from work, and leisure/recreational activities. Commuting typically makes up a majority of the miles that a person drives his or her vehicle. Often, the advantages that larger vehicles offer (additional seating, payload, tow capacity, etc.) are not necessary for commuting to and from work. In contrast, the leisure or recreational activities that take place during the evenings, weekends, vacations, etc. often require the large vehicle amenities. Indeed, these amenities usually dictate the vehicle selection in the first place. However, the leisure and recreational activities typically consume a small percentage of the annual vehicle mileage.

As fuel costs rise, larger vehicle owners are paying an increasingly disproportionate amount to fuel their vehicles for commuting—an activity that does not typically require the amenities that vehicles having a lower fuel economy offer. Two solutions to this problem are currently available: replace the current vehicle with a more fuel efficient model, or purchase an additional "commute" vehicle that has a higher fuel economy. The first option is not attractive because it forces the vehicle owner to sacrifice the advantages of the larger vehicle (additional seating, payload, tow capacity, four-wheel drive, etc.), and may create significant negative financial impacts as described above. The second option is not attractive because it results in an overall increase in the monthly amount a customer pays for transportation.

SUMMARY OF THE INVENTION

A method and computer system are provided for structuring a vehicle owner or lessor's vehicle financing to obtain an additional vehicle while reducing, maintaining or incrementally increasing, the owner's combined transportation costs for the current and additional vehicle.

One objective of the present invention is to reduce the extent to which current vehicle owners or lessors divest themselves of their vehicles prematurely due primarily to increased fuel costs. This objective seeks to reduce the negative impacts that such premature divestiture have on the value of the residual value of the divested automobiles, and the automobile manufacturing and credit industries generally.

Another objective of the present invention is to enable owners of vehicles that own a lower fuel economy vehicle to additionally purchase or lease a vehicle having a higher fuel economy for commuting and other routine driving activities, without increasing their total transportation costs. Alternatively, current owners of higher fuel economy vehicles can purchase or lease an additional lower fuel economy vehicle with financing structured in accordance with the present invention to avoid a significant increase, if any, in their total transportation budget.

A preferred method for implementing the present invention includes determining a first monthly loan or lease payment for a first loan or lease on a first vehicle that a customer currently owns or leases. An outstanding loan or lease balance for the first loan or lease is also determined, as well as an average amount that the first vehicle is driven each month. Based on this information, a monthly transportation cost for the first vehicle is calculated. A cost for a second vehicle having a higher fuel economy than the first vehicle is also determined. A second loan or lease and a second monthly loan or lease payment for both (the first and second) vehicles, combined, is determined. An average amount that the first and second vehicles will be driven each month is defined. A monthly transportation cost for the first and second vehicles combined is then calculated based on the second monthly loan or lease payment and the average amount that the first and second vehicles will be driven each month, respectively. The transportation cost may be based at least in part on the cost of fuel, or a fuel cost factor.

If the monthly transportation cost for the first and second vehicles combined is acceptable to the buyer/lessee, the first and second vehicles are financed with the second loan or lease. Preferably, the monthly transportation cost associated with both vehicles, financed under the second loan or lease, is equal to or less than the monthly transportation cost associated with the first vehicle alone. Alternatively, an incremental increase in cost may be assumed by the buyer/lessee.

According to another embodiment, the first vehicle has a higher fuel economy than the second vehicle.

The method may additionally include calculating financing terms for two or more financing packages for the first and second vehicles combined. Then, the two or more financing packages are compared to identify an optimal financing package with which the first and second vehicles will be financed.

The method may additionally include consideration of other monthly transportation costs including insurance payments and maintenance costs. Preferably, these costs are allocated based at least in part on the respective amount that the first and second vehicles are driven.

The method may additionally include providing a manufacturer's warranty with the second vehicle, or extending the manufacturer's warranty, on the first vehicle or offering a service protection plan.

Another embodiment of the present invention includes a computer system that is operably programmed and configured to implement the data processing aspects of the method summarized above. The algorithm and details associated with the implementation of this and other embodiments of the present invention are described in greater detail below.

DETAILED DESCRIPTION OF THE PREFERRED EMBODIMENT(S)

Business Process

One aspect of the present invention is a vehicle incentive program that enables larger vehicle owners to keep and enjoy their larger vehicles for leisure or recreational activities, and acquire a more fuel-efficient vehicle for their daily commute and other routine driving activities, while maintaining (or in some cases reducing) the owners' total transportation costs (e.g., monthly payment, insurance, fuel, repairs, etc.).

Figure 1:
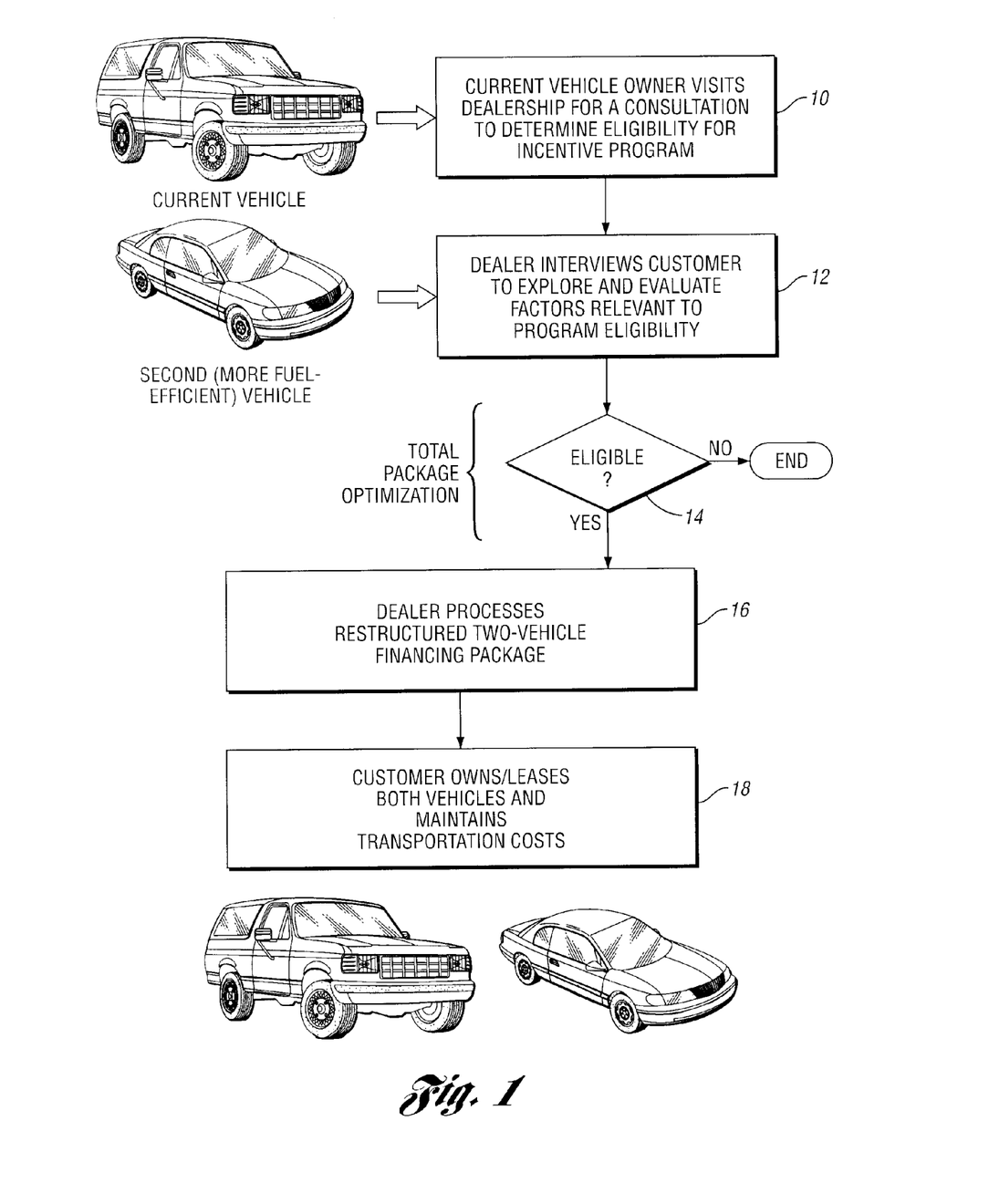
FIG. 1 is a block flow diagram illustrating an overview of a preferred embodiment of the present invention.

FIG. 1 is a block flow diagram illustrating a high-level overview of one embodiment of the present invention. At block 10, a current vehicle owner (or lessor) visits an automobile dealership to determine his or her eligibility for the vehicle incentive program. In accordance with a preferred embodiment of the present invention, the vehicle incentive program enables eligible current vehicle owners/lessors to purchase/lease a second vehicle while maintaining (or in some cases reducing) their monthly financing payment.

At block 12, the dealer interviews the current vehicle owner/lessor to determine whether he or she is eligible to participate in the program. Factors relevant to determining program eligibility may include (but are not limited to) the make, model and year of the currently-owned vehicle, the mileage and condition of the currently-owned vehicle, the fuel economy of the currently-owned vehicle, the current owner's credit score and general credit eligibility, the projected residual value of the currently-owned vehicle, the remaining financing balance on the currently-owned vehicle, the cost of the second vehicle, the projected residual value of that vehicle, the fuel economy of the second vehicle, available financing rates, etc.

In a preferred embodiment of the present invention, the second vehicle is more fuel efficient than the currently-owned vehicle. In an alternative embodiment, the vehicle that the customer currently owns has a lower fuel economy than the second vehicle.

The customer then selects the second vehicle from any available vehicle. In another embodiment, the customer selects the second vehicle from a sub-set of vehicles that the dealership has selected. In yet another embodiment, the dealership only offers a particular vehicle with the incentive program.

To determine program eligibility at block 14, the dealer attempts to optimize the total package costs associated with the currently-owned vehicle and the second more fuel efficient vehicle. In accordance with a preferred embodiment of the present invention, the dealer investigates a restructured financing plan for the currently-owned vehicle, and combined financing with the second vehicle. The dealer then allocates mileage and fuel costs to the vehicles such that routine driving and commuting is allocated to the second (more fuel efficient) vehicle, and recreational driving is allocated to the currently-owned vehicle.

Preferably, the resulting fuel savings, coupled with the restructured financing on the currently-owned vehicle, offsets the financing cost of the second vehicle, allowing the owner to acquire a second vehicle while maintaining (or reducing) his or her total monthly transportation costs. Alternatively, the owner may incur an incremental increase in monthly transportation cost.

Other factors affecting transportation costs may also be considered during the program eligibility/evaluation/optimization steps. For example, vehicle maintenance and insurance costs may also be allocated on a pro-rata basis to the two vehicles according to the owner's driving habits. For example, lower insurance rates may be offered for the currently-owned vehicle due to the reduced amount the vehicle will be driven under the program. Similarly, maintenance costs may be reduced for the currently-owned vehicle because it is driven less. In another embodiment, a restructured warranty program may be offered for the currently-owned vehicle that may further reduce or offset transportation costs. The new vehicle will likely have the traditional manufacturer warranty package.

If the customer is eligible to participate in the program, the dealer prepares a two-vehicle restructured financing package, illustrated at block 16. Restructured insurance and maintenance plans may also be processed at this time. In a preferred embodiment, the financing for the current vehicle is restructured for 60 months at the current interest rate. This financing is combined with 60 month financing for the new vehicle, resulting in a total two-vehicle financing cost. Of course, other financing strategies, including different terms, rebates, and other incentive programs may also be considered. In one embodiment, multiple financing programs and strategies are proposed and compared to select one that is most desirable by the dealer and/or customer.

Customers that lease vehicles may also participate in the incentive program. For example, a customer may renew his or her current lease for an extended period, and obtain a new lease on a second, more fuel efficient vehicle. An appropriate algorithm may be implemented to determine optimized terms and rates for the two leases. Residual vehicle values are also taken into consideration in determining the lease term. Typically, the residual value of the less fuel efficient vehicle will be higher than normal due to the decreased driving under the two-vehicle program. In another embodiment, the customer does not renew the lease on his or her current vehicle, but returns the vehicle and leases two new vehicles, one having a higher fuel economy than the other. In yet another embodiment, a current vehicle owner receives a restructured financing plan for the currently-owned vehicle, and leases the second, more fuel efficient model.

If satisfied with the terms of the combined financing package (and insurance package, if applicable), the customer executes the appropriate documents to complete the transaction, as represented in block 18. Preferably, the customer maintains ownership/lease of his or her current vehicle, and acquires ownership/lease of a second vehicle while reducing, maintaining or incrementally increasing his or her total transportation costs.

Figure 2:
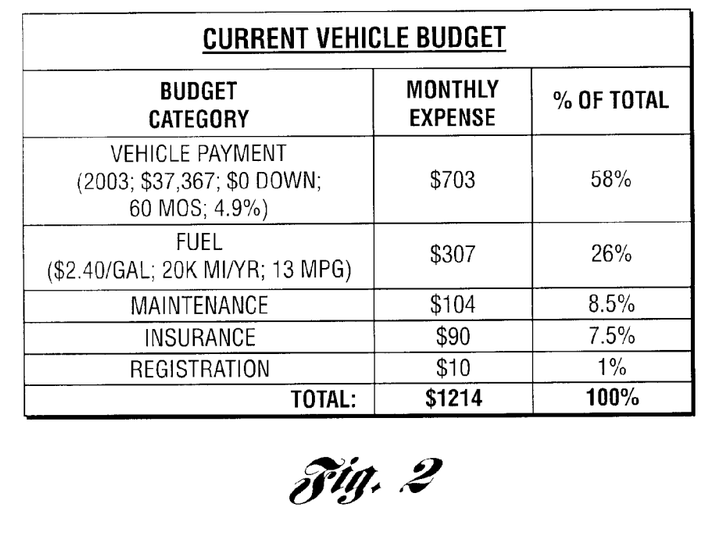
FIG. 2 is a chart illustrating a hypothetical one-vehicle budget.

FIG. 2 is a table showing an example vehicle budget for a currently-owned vehicle. All figures are approximate. The vehicle was purchased new in 2003 for $37,367 with $0 down payment. Financing was for 60 months at 4.9%, resulting in a monthly financing payment of $703.

The vehicle owner commutes 60 miles each day for work, or 15,000 miles annually. An additional 5,000 miles are driven annually for leisure and recreational travel activities (weekends, vacations, towing boat, etc.). With a current fuel cost of $2.40 per gallon, and a fuel economy of 13 miles per gallon, the monthly fuel expense is $307.

The vehicle was sold with a 36,000 mile warranty, and averages $104 in monthly maintenance expenses up to 100,000 miles. Insurance for the vehicle is $90/month, and the licensing/registration expense is $10/month. The total monthly transportation cost for the current vehicle, including financing payment, fuel, maintenance, insurance, and registration is $1214.

Figure 3:
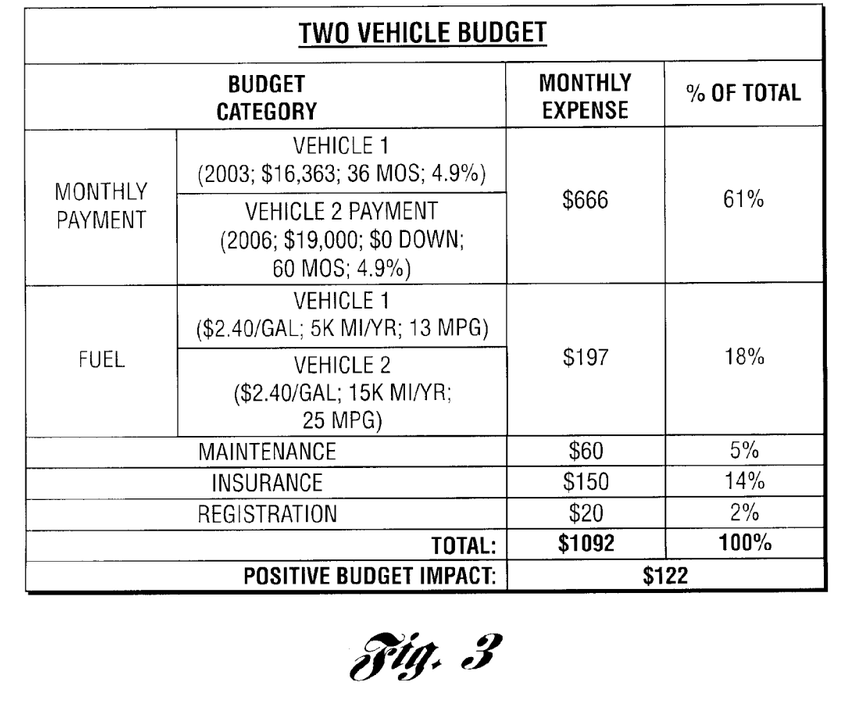
FIG. 3 is a chart illustrating a hypothetical two-vehicle budget in accordance with a preferred embodiment of the present invention.

FIG. 3 is a table showing an example two-vehicle package that includes the currently-owned vehicle ("Vehicle 1") and a new vehicle having a higher fuel economy ("Vehicle 2"). In this example, routine/commute driving (15,000 miles annually) is allocated to the second vehicle having a higher fuel economy. Leisure and recreational driving (5,000 miles annually) is allocated to the currently-owned vehicle.

A restructured financing package is created that includes the pay-off balance for current Vehicle 1 (e.g. the balance at 36 months being $16,363) and the cost of new Vehicle 2 ($19,000). Consolidated financing for the two vehicles (e.g. $35,363; 60 months, 4.9%) is provided, resulting in a monthly financing payment of $666.

Preferably, insurance and maintenance plans are also restructured to take into account the proportional amount that each vehicle will be driven. For example, decreased insurance rates may be offered for the vehicle having the lower fuel economy because the vehicle will be driven less. An extended service plan may also be offered. Maintenance costs for Vehicle 1 should be lower due to the decreased driving, and Vehicle 2 will have a new vehicle warranty, typically for 36,000 miles. In this example, total monthly maintenance for the two vehicles is estimated to be $60, and the monthly insurance payment is estimated to be $150. The total monthly transportation cost for the two vehicles, including financing payment, fuel, maintenance, insurance, and registration is $1092. In this example, a positive budget impact of $122 ($1214-$1092) is realized.

Data Processing and Computing Environment

Preferably, a computer system is used to process factors relevant to the two-vehicle financing package and automatically select or output one or more financing programs having optimized terms. For example, the computer system may dynamically process different financing programs having different durations and interest rates to arrive at an optimal financing package configuration. The computer system may compare the cumulative total cost of two separate financing packages for each of the vehicles to the cost of a single combined financing package, as one may be better than the other. If the customer is leasing his or her current vehicle, the computer system may or output one or more financing programs having optimized lease program terms. Alternately, as described above, a combined purchase/lease arrangement may be an output option. According to another embodiment, the computer system may additionally be used to process a selected program, including the preparation and printing of the forms and paperwork necessary to complete the purchase/lease transaction.

Figure 4:
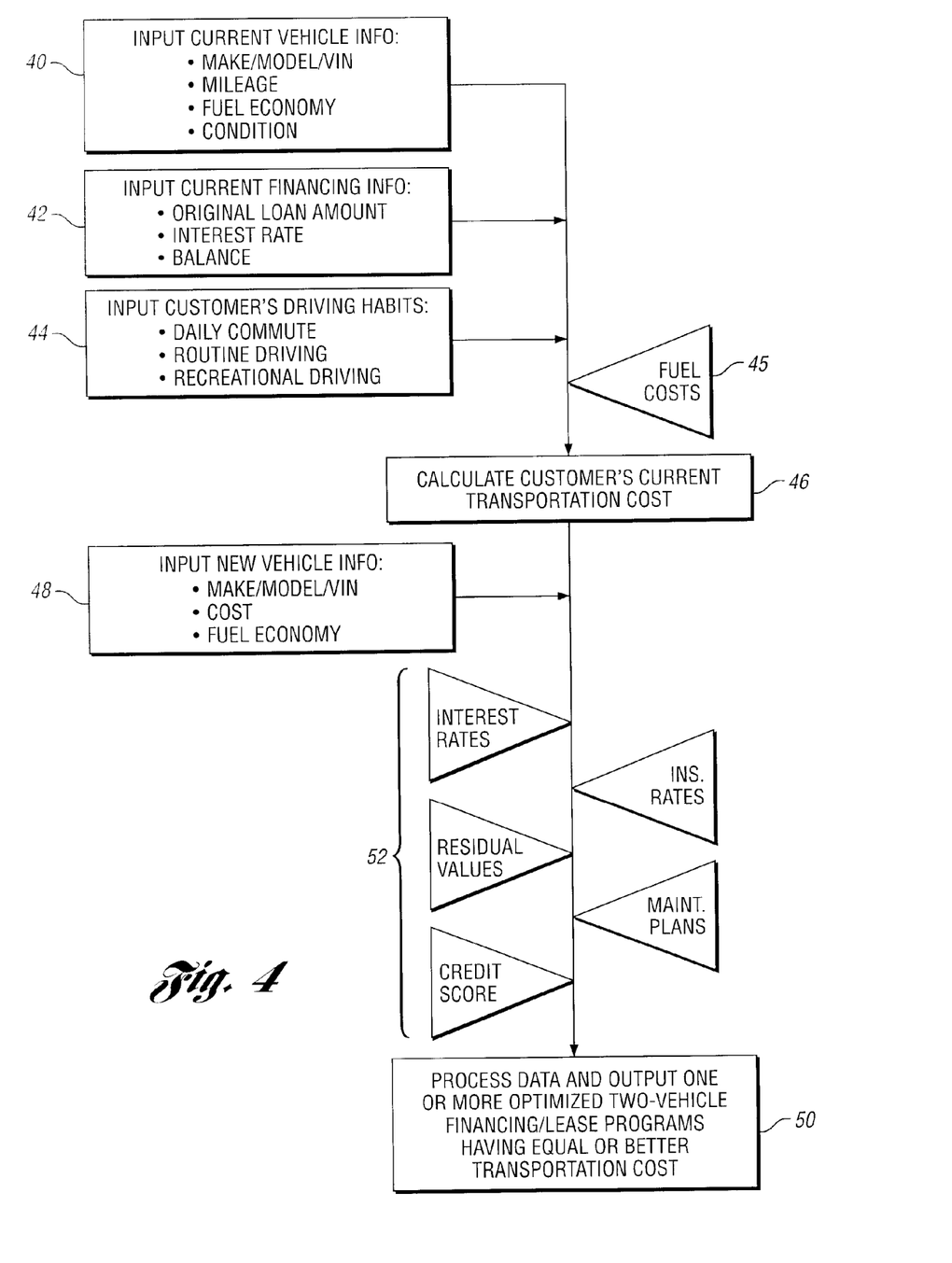
FIG. 4 is a block flow diagram illustrating data processing aspects of a preferred embodiment of the present invention.

FIG. 4 is a block-flow diagram illustrating an algorithm for computer-implemented data processing in accordance with a preferred embodiment of the present invention. Of course, other algorithms, or modifications to the preferred algorithm, may be practiced within the scope of the present invention.

At block 40, information associated with the currently-owned (or leased) vehicle is input. This information may include, but is not limited to, the make and model of the current vehicle, the vehicle identification number, the current mileage of the vehicle, the vehicle's fuel economy, the vehicle's current condition, current insurance premiums and average maintenance costs.

At block 42, information relating to the financing of the current vehicle is input. This information includes but is not limited to the original loan balance, the remaining balance, the duration of the loan and the interest rate. In the case of leased vehicles, this information includes the current lease term, residual value, etc.

At block 44, information relating to the customer's driving habits are input. This information may include but is not limited to the number of miles the customer commutes annually, the number of miles that the customer engages in other routine driving (i.e. common driving that does not require the large-vehicle amenities associated with the currently-owned vehicle), and the customer's recreational driving habits (weekend driving, vacation driving, etc.).

At block 46, the customer's current transportation cost is calculated. The transportation cost may be based on the financing payment, the cost of fuel 45 as applied to the customer's driving habits, the cost to insure the vehicle, vehicle maintenance costs, registration costs, etc.

At block 48, information relating to the second more fuel efficient vehicle is input. This information includes but is not limited to the make and model number of the vehicle, the vehicle identification number, the cost of the vehicle, the vehicle's fuel economy, the vehicle's warranty terms, etc.

At block 50, the computer system processes the data to identify one or more optimized financing packages that enables the customer to maintain ownership (or lease) of the current vehicle, and purchase (or lease) the second vehicle having a higher fuel economy in such a fashion that the customer's transportation costs are substantially maintained or reduced. In some instances, more than one program may be fashioned, and the dealer and/or customer may select from the available financing/lease (or hybrid purchase and lease) programs.

In addition to the input data, the computation may be based on other data 52 including but not limited to available interest rates, vehicle residual values, the customer's credit score, insurance premiums, and warranty/maintenance plans available for the new vehicle and available extended maintenance/warranty plans for the currently-owned/leased vehicle.

Provided the terms of a particular restructured two-vehicle financing package are acceptable to the dealership and the buyer/lessee, the computer system may be operated to process the financing for the first and second vehicles with the second loan or lease. Financing processing may include generating, completing and/or submitting any necessary forms for the transaction.

Automated or semi-automated processing may also include communicating electronically with any necessary agencies, such as credit agencies, banking institutions, vehicle registration and licensing agencies, the vehicle manufacturer, etc. to obtain or post information necessary or relevant to the financing transaction.

Figure 5:
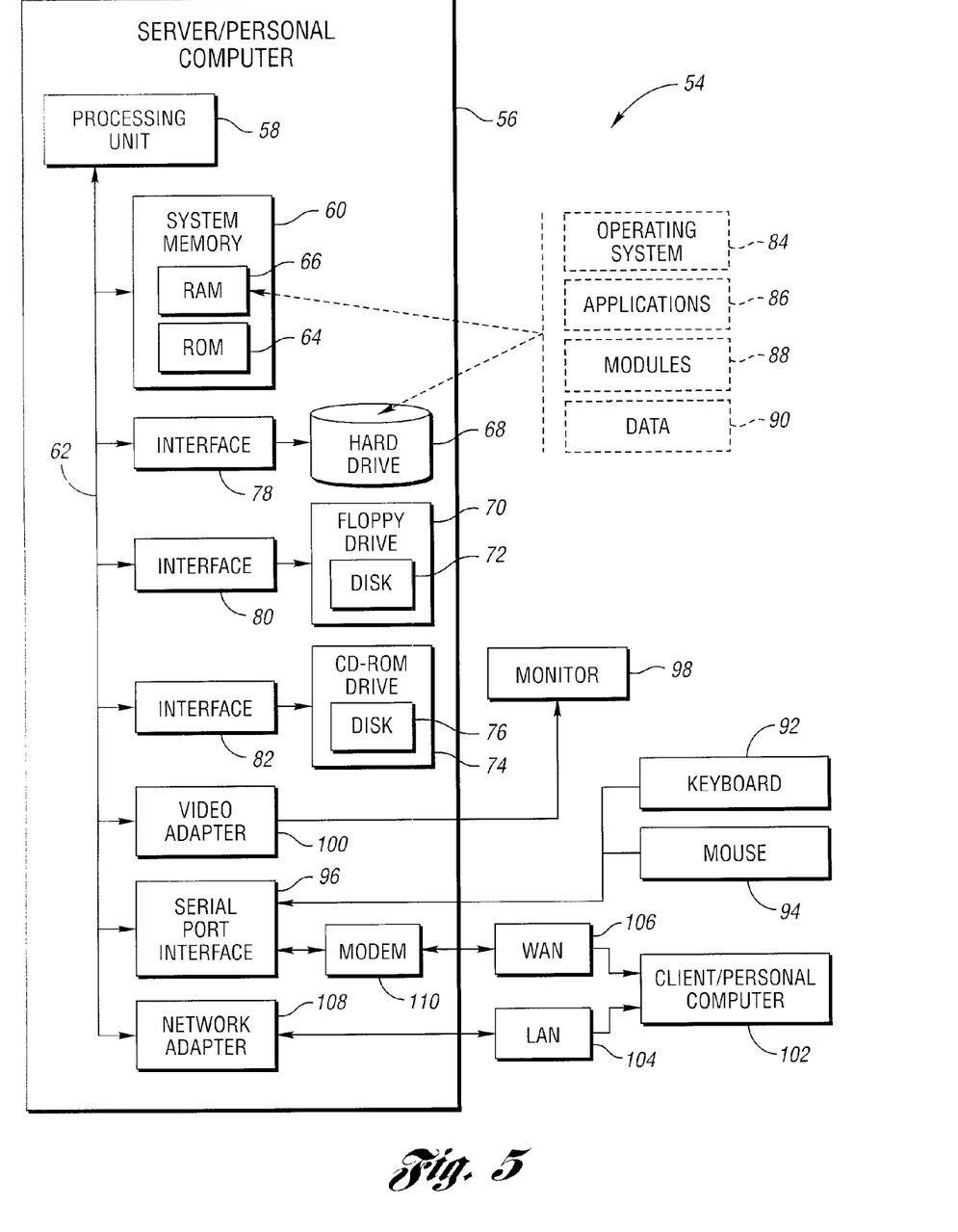
FIG. 5 is a schematic illustrating an example computing environment for implementing computational or data processing aspects of the present invention.

FIG. 5 and its associated description are intended to provide a brief, general description of suitable computing environments for implementing data processing and other computational aspects of the present invention, as described in greater detail below. According to one embodiment, the system comprises a stand-alone personal computing environment. According to another embodiment, the system comprises a networked computer environment having a typical server-client configuration. Notably, a plurality of computing environments are understood by those skilled in the art of computing architecture and may be configured for implementing the present invention.

FIG. 5 illustrates a preferred computer system 54 for implementing the present invention. The computer system 54 comprises a server or personal computer 56 including a processing unit 58, a system memory 60 and a system bus 62 that interconnects various system components including the system memory 60 to the processing unit 58. The system bus 62 may comprise any of several types of bus structures including a memory bus or memory controller, a peripheral bus, and a local bus using a bus architecture such as PCI, VESA, Microchannel (MCA), ISA and EISA. The system memory includes read only memory (ROM) 64 and random access memory (RAM) 66. A basic input/output system (BIOS), containing the basic routines that help to transfer information between elements within the computer 56, such as during start-up, is stored in ROM 64. The computer 56 further includes a hard disk drive 68, a magnetic disk drive (floppy drive, 70) to read from or write to a removable disk 72, and an optical disk drive (CD-ROM Drive, 74) for reading a CD-ROM disk 76 or to read from or write to other optical media. The hard disk drive 68, magnetic disk drive 70, and optical disk drive 74 are connected to the system bus 62 by a hard disk drive interface 78, a magnetic disk drive interface 80 and an optical drive interface 82, respectively. The drives and their associated computer-readable media provide nonvolatile storage of data, data structures, computer-executable instructions (program code such as dynamic link libraries, and executable files), etc. for the computer 56. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM, including an operating system 84, one or more application programs 86, other program modules 88, and program data 90. A user may enter commands and information into the computer 56 through a keyboard 92 and pointing device, such as a mouse 94. Other input devices (not shown) may include a microphone, dictaphone, scanner, or the like. These and other input devices are often connected to the processing unit 58 through a serial port interface 96 that is coupled to the system bus 92, but may be connected by other interfaces, such as a parallel port, game port or a universal serial bus (USB). A monitor 98 or other type of display device is also connected to the system bus 62 via an interface, such as a video adapter 100. In addition to the monitor, the computer may include other peripheral output devices (not shown), such as speakers and a printer.

In a networked configuration, there are several client computers 102 having a similar architecture to computer 56 and configured to operate as a client to computer 56 configured to operate as a server. The logical connections between server computer 56 and any client computer 102 include (but are not limited to) a local area network (LAN) 104 and a wide area network (WAN) 106. Such networking environments are commonplace in offices, enterprise-wide computer networks, intranets and the Internet.

When used in a LAN networking environment, the server computer 56 is connected to the local network 104 through a network interface or adapter 108. When used in a WAN networking environment, the server computer 56 typically includes a modem 110 or other means for establishing communications over the wide area network 106, such as the Internet. The modem 110, which may be internal or external, is connected to the system bus 62 via the serial port interface 96 In a networked environment, program modules depicted relative to the server computer 56, or portions of them, may be stored in a remote memory storage device (not shown).

While the best mode for carrying out the invention has been described in detail, those familiar with the art to which this invention relates will recognize various alternative designs and embodiments for practicing the invention as defined by the following claims.

What is claimed:

1. A method for restructuring a vehicle owner or lessor's current vehicle financing to obtain an additional vehicle, the method comprising:

receiving instructions at one or more computers configured to restructure a vehicle owner or lessee's current vehicle financing;

determining by the one or more computers a first monthly loan or lease payment for a first loan or lease on a first vehicle that a customer currently owns or leases;

determining by the one or more computers an outstanding loan or lease balance for the first loan or lease;

determining by the one or more computers an average amount that the first vehicle is driven each month;

determining by the one or more computers a monthly insurance payment for the first vehicle;

calculating by the one or more computers a monthly transportation cost for the first vehicle, the monthly transportation cost being calculated based on the first monthly loan or lease payment, the average amount that the first vehicle is driven each month, and the monthly insurance payment;

determining by the one or more computers an acquisition price for a second vehicle having a higher fuel economy than the first vehicle;

determining by the one or more computers a second loan or lease and a second monthly loan or lease payment for both vehicles combined;

determining by the one or more computers an average amount that the first and second vehicles will be driven each month, respectively, wherein a greater average amount is allocated to the second vehicle based on the higher fuel economy of the second vehicle;

determining by the one or more computers a pro-rata monthly insurance payment distributed between the first and second vehicles, the monthly insurance payment being based at least in part on the average amount that the first and second vehicles will be driven each month, respectively;

calculating by the one or more computers a monthly transportation cost for the first and second vehicles combined, the monthly transportation cost being calculated based on the second monthly loan or lease payment, the average amount that the first and second vehicles will be driven each month, respectively, and the monthly insurance payment for the first and second vehicles combined; and financing the first and second vehicles with the second loan or lease, the second loan or lease being a restructured loan or lease of the first loan or lease to include payment of the second vehicle.

2. The method of claim 1 wherein the first and second vehicles are financed with the second loan or lease wherein the monthly transportation cost for the first and second vehicles combined is equal to or less than the monthly transportation cost for the first vehicle.

3. The method of claim 1 wherein the financing for the first and second vehicles combined is more expensive than the financing for the first vehicle.

4. The method of claim 1 wherein the monthly transportation costs are calculated by the one or more computer based at least in part on fuel cost.

5. The method of claim 1 additionally comprising:
(i) calculating by the one or more computers financing terms for two or more financing packages for the first and second vehicles;
(ii) comparing the two or more financing packages to identify an optimal financing package; and
(ii) selecting an optimal financing package to finance the first and second vehicles.

6. The method of claim 5 wherein one or more of steps (ii) and (iii) are performed automatically by a computer.

7. The method of claim 1 additionally comprising:
determining by the one or more computers an average monthly maintenance cost for the first vehicle;
calculating by the one or more computers the monthly transportation cost for the first vehicle based additionally on the average monthly maintenance cost;
determining by the one or more computers an average monthly maintenance cost for the first and second vehicles combined, the average monthly maintenance cost being lower for the first vehicle than the second vehicle based at least in part on the average amount that the first and second vehicles will be driven each month, respectively; and
calculating by the one or more computers the monthly transportation cost for the first and second vehicles combined based additionally on the average monthly maintenance cost for the first and second vehicles combined.

8. The method of claim 1 additionally comprising providing a manufacturer's warranty with the second vehicle.

9. The method of claim 1 additionally comprising providing an extended warranty on the first vehicle.

10. The method of claim 9 wherein the owner purchases the extended warranty on the first vehicle.

11. A computer system for restructuring a vehicle owner or lessor's current vehicle financing to obtain an additional vehicle, the computer system comprising one or more computers operably programmed and configured to:

receive instructions for restructuring a vehicle owner or lessee's current vehicle financing;

receive input defining a first monthly loan or lease payment for a first loan or lease on a first vehicle that a customer currently owns;

receive input defining an outstanding loan or lease balance for the first loan or lease;

receive input defining an average amount that the first vehicle is driven each month;

receive input defining a monthly insurance payment for the first vehicle;

calculate a monthly transportation cost for the first vehicle, the monthly transportation cost being calculated based on the first monthly loan or lease payment, the average amount that the first vehicle is driven each month, and the monthly insurance payment;

receive input defining a cost for acquiring a second vehicle having a higher fuel economy than the first vehicle;

determine a second loan or lease and a second monthly loan or lease payment for both vehicles combined;

receive input defining an average amount that the first and second vehicles will be driven each month, respectively, wherein a greater average amount is allocated to the second vehicle based on the higher fuel economy of the second vehicle; and determine a pro rata monthly insurance payment distributed between the first and second vehicles, the monthly insurance payment being based at least in part on the average amount that the first and second vehicles will be driven each month, respectively; and calculate a monthly transportation cost for the first and second vehicles combined, the monthly transportation cost being calculated based on the second monthly loan or lease payment, and the average amount that the first and second vehicles will be driven each month, respectively, and the monthly insurance payment for the first and second vehicles combined; and output one or more financing programs for financing the first and second vehicles with the second loan or lease, the second loan or lease being a restructured loan or lease of the first loan or lease to include payment of the second vehicle.

12. The computer system of claim 11 additionally programmed and configured to process financing for the first and second vehicles with the second loan or lease if wherein the monthly transportation cost for the first and second vehicles combined is equal to or less than the monthly transportation cost for the first vehicle alone with the first loan or lease.

13. The computer system of claim 11 wherein the monthly transportation costs are calculated based at least in part on fuel cost.

14. The computer system of claim 11 additionally programmed and configured to:

calculate financing terms for two or more financing packages for the first and second vehicles;

compare the two or more financing packages to identify an optimal financing package; and selecting an optimal financing package to finance the first and second vehicles.

15. The computer system of claim 11 additionally programmed and configured to:

receive input defining an average monthly maintenance cost for the first vehicle;

calculate the monthly transportation cost for the first vehicle based additionally on the average monthly maintenance cost;

determine an average monthly maintenance cost for the first and second vehicles combined, the average monthly maintenance cost being lower for the first vehicle than the second vehicle based at least in part on the average amount that the first and second vehicles will be driven each month, respectively; and calculate the monthly transportation cost for the first and second vehicles combined based additionally on the average monthly maintenance cost for the first and second vehicles combined.

16. A method for determining a vehicle owner or lessee's transportation cost in a two-vehicle financing program, the method comprising:

receiving instructions by one or more computers configured to determine a vehicle owner or lessee's transportation cost;

determining by the one or more computers a price for a first vehicle having a first fuel economy;

estimating by the one or more computers an average amount that the first vehicle will be driven each month by a vehicle owner or lessee;

determining by the one or more computers an acquisition price for a second vehicle having a second fuel economy, the second vehicle having a higher fuel economy than the first vehicle;

estimating by the one or more computers an average amount that the second vehicle will be driven each month by the vehicle owner or lessee, wherein a greater average amount is allocated to the second vehicle based on the higher fuel economy of the second vehicle;

determining by the one or more computers terms of a loan or lease financing for both vehicles combined, the terms including a monthly loan or lease payment;

determining by the one or more computers a pro-rata monthly insurance payment distributed between the first and second vehicles, the monthly insurance payment being based at least in part on the estimated average amount that the first and second vehicle will be driven each month, respectively;

calculating by the one or more computers a monthly transportation cost for the first and second vehicles combined, the monthly transportation cost being calculated based on the monthly loan or lease payment, the estimated amount that the first and second vehicles will be driven each month, respectively and the monthly insurance payment for the first and second vehicles combined; and financing the first and second vehicles with a financing package based at least in part on the monthly transportation cost for both vehicles combined.

17. The method of claim 16 wherein the price for the first vehicle is an outstanding loan or lease balance for an existing loan or lease on the first vehicle.

18. The method of claim 16 wherein the monthly transportation costs are calculated by the one or more computers based at least in part on fuel cost.

19. The method of claim 16 additionally comprising:
(i) calculating by the one or more computers financing terms for two or more financing packages for the first and second vehicles combined;
(ii) comparing the two or more financing packages to identify an optimal financing package; and
(ii) selecting an optimal financing package to finance the first and second vehicles together.

20. The method of claim 19 wherein one or more of steps (ii) and (iii) are performed automatically by a computer.

* * * * *

UNITED STATES PATENT AND TRADEMARK OFFICE
CERTIFICATE OF CORRECTION

| | |
|---|---|
| PATENT NO. | : 7,571,128 B1 |
| APPLICATION NO. | : 11/275744 |
| DATED | : August 4, 2009 |
| INVENTOR(S) | : Gregory Brown |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Seventh Day of September, 2010

David J. Kappos
*Director of the United States Patent and Trademark Office*